(12) United States Patent
Mehandjiysky et al.

(10) Patent No.: US 10,838,467 B1
(45) Date of Patent: Nov. 17, 2020

(54) ELECTRONIC DEVICE HINGES

(71) Applicant: HEWLETT-PACKARD DEVELOPMENT COMPANY, L.P., Spring, TX (US)

(72) Inventors: Dimitre D. Mehandjiysky, Spring, TX (US); Nishit Gupta, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/414,560

(22) Filed: May 16, 2019

(51) Int. Cl.
*G06F 1/16* (2006.01)
*E05D 3/06* (2006.01)

(52) U.S. Cl.
CPC ............. *G06F 1/1681* (2013.01); *E05D 3/06* (2013.01); *G06F 1/1616* (2013.01); *G06F 1/1652* (2013.01); *E05Y 2900/606* (2013.01)

(58) Field of Classification Search
CPC ........ G06F 1/1652; G06F 1/1681; E05D 3/06
See application file for complete search history.

(56) References Cited

U.S. PATENT DOCUMENTS

| | | | |
|---|---|---|---|
| 6,466,369 B1 | 10/2002 | Maddock | |
| 6,900,981 B2 | 5/2005 | Kuivas et al. | |
| 7,907,415 B2 | 3/2011 | Ueyama | |
| 9,625,947 B2 * | 4/2017 | Lee | G06F 1/1616 |
| 9,870,031 B2 | 1/2018 | Hsu et al. | |
| 9,946,310 B1 * | 4/2018 | Huang | G06F 1/1641 |
| 10,082,838 B1 | 9/2018 | Hong et al. | |
| 2006/0238970 A1 | 10/2006 | Ukonaho et al. | |
| 2010/0232100 A1 * | 9/2010 | Fukuma | H04M 1/0216 361/679.01 |
| 2012/0307423 A1 * | 12/2012 | Bohn | G06F 1/1652 361/679.01 |
| 2014/0126133 A1 * | 5/2014 | Griffin | G06F 1/1652 361/679.27 |
| 2015/0277505 A1 | 10/2015 | Lim et al. | |
| 2015/0277506 A1 | 10/2015 | Cheah et al. | |
| 2016/0370829 A1 * | 12/2016 | Hsu | G06F 1/1681 |
| 2017/0208699 A1 * | 7/2017 | McDermid | G06F 1/1616 |
| 2017/0303414 A1 * | 10/2017 | Chu | H05K 5/0017 |
| 2018/0059734 A1 * | 3/2018 | Knoppert | G06F 1/1652 |
| 2018/0136700 A1 * | 5/2018 | Chen | E05D 7/00 |
| 2018/0192528 A1 * | 7/2018 | Lin | H05K 5/0017 |

FOREIGN PATENT DOCUMENTS

WO    WO-2016209247 A1 * 12/2016 ............... E05D 3/06

\* cited by examiner

*Primary Examiner* — Nidhi Thaker
(74) *Attorney, Agent, or Firm* — Conley Rose

(57) ABSTRACT

Example hinges for an electronic device and electronic devices utilizing the hinges are disclosed. In an example, the electronic device includes a first housing member, a second housing member, and a hinge coupled between the first housing member and the second housing member. The hinge includes a first end coupled to the first housing member, a second end coupled to the second housing member, and a hinge length extending along the hinge from the first end to the second end. The hinge length is to increase as the first housing member is rotated about the hinge toward the second housing member.

13 Claims, 4 Drawing Sheets

ELECTRONIC DEVICE HINGES

BACKGROUND

Electronic devices may incorporate flexible displays that can be deformed (e.g., bent, rolled, folded, etc.) without losing electric functionality and connectivity. Such flexible displays may be deformed to a minimum radius of curvature before the display sustains damage.

BRIEF DESCRIPTION OF THE DRAWINGS

Various examples will be described below referring to the following figures.

DETAILED DESCRIPTION

Figure 1:
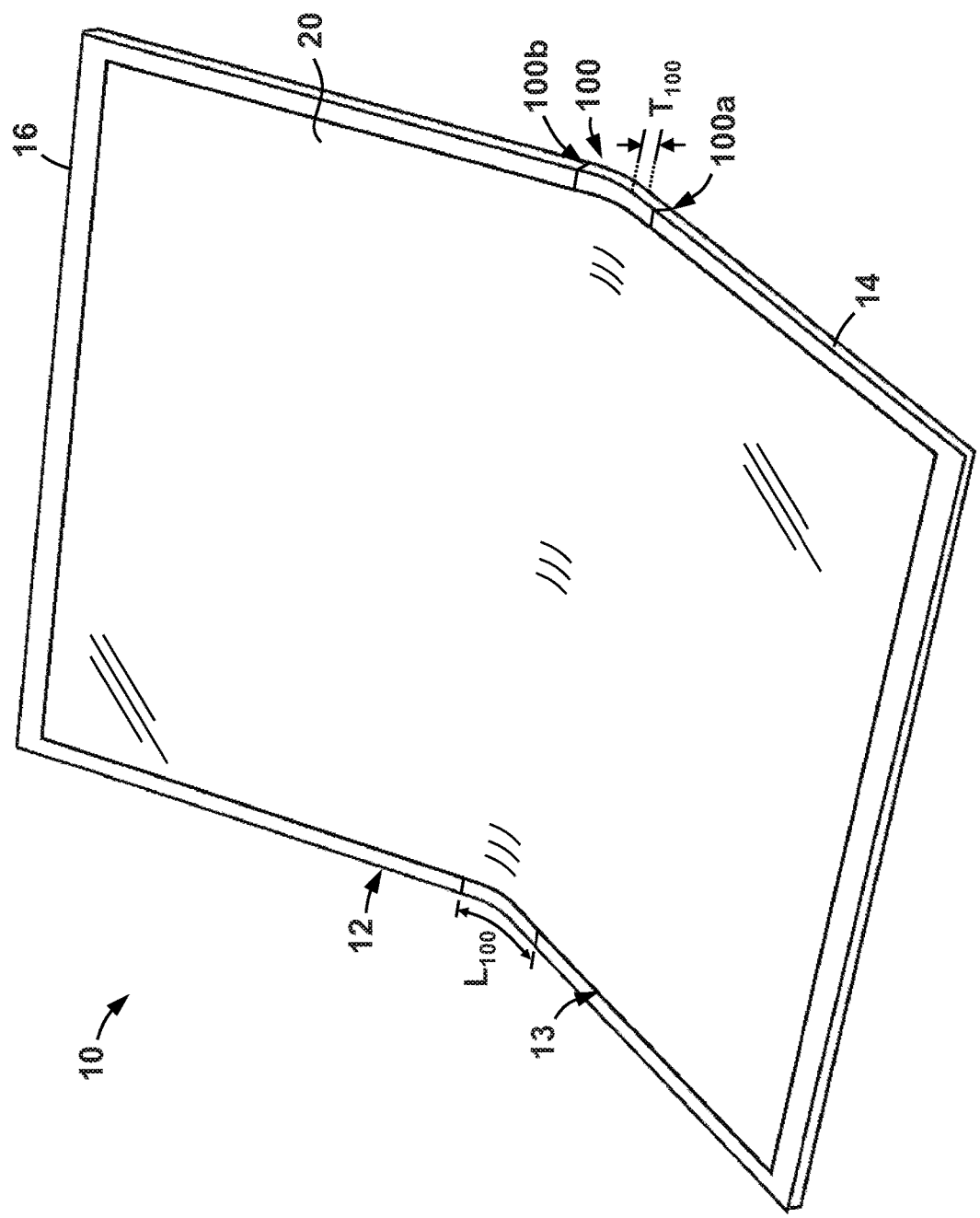
FIG. 1 is a perspective view of an electronic device including a flexible display and a hinge according to some examples.

In the figures, certain features and components disclosed herein may be shown exaggerated in scale or in somewhat schematic form, and some details of certain elements may not be shown in the interest of clarity and conciseness. In some of the figures, in order to improve clarity and conciseness, a component or an aspect of a component may be omitted.

In the following discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. In addition, as used herein, the terms "axial" and "axially" generally refer to positions along or parallel to a central or longitudinal axis (e.g., central axis of a body or a port), while the terms "lateral" and "laterally" generally refer to positions located or spaced to the side of the central or longitudinal axis.

As used herein, including in the claims, the word "or" is used in an inclusive manner. For example, "A or B" means any of the following: "A" alone, "B" alone, or both "A" and "B." In addition, when used herein including the claims, the words "generally," "substantially," "approximately," or "about" mean within a range of plus or minus 10% of the stated value. As used herein, the term "display" refers to an electronic display (e.g., a liquid crystal display (LCD), a plasma display, etc.) that is to display images generated by an associated computing device. The term "flexible display" refers to a display that may be deformed (e.g., bent, rolled, folded, etc.) within a given parameter or specification (e.g., a minimum radius of curvature) without losing electrical function or connectivity. As used herein, the term "electronic device," refers to a device that is to carry out machine readable instructions, and may include internal components, such as, processors, power sources, memory devices, etc. For example, an electronic device may include, among other things, a personal computer, a smart phone, a tablet computer, a laptop computer, a personal data assistant, a wearable computer, etc.

As previously described, electronic devices may incorporate a flexible display. Often such electronic devices are transitionable between open and closed positions (e.g., such as is the case for a laptop style electronic device) to facilitate transport and storage of the electronic device when not in use. When the electronic device is placed in the closed (often folded) position, the flexible display may be rolled or deformed. While the flexible display is generally capable of such a deformation, there are limits to the deformation such a display may experience. For example, if the display is deformed excessively (such as when the associated electronic device is transitioned into a closed position), the display may be damaged. Accordingly, examples disclosed herein include electronic devices that employ hinges that are to support and accommodate a controlled deformation of a flexible display as the electronic device is transitioned to and between open and closed positions.

Referring now to FIG. 1, an electronic device 10 according to some examples disclosed herein is shown. Electronic device 10 includes a housing 12 and a flexible display 20 partially disposed within the housing 12.

Housing 12 includes a first housing member 14 and a second housing member 16. The first and second housing members 14, 16 are rotatably coupled to one another at a hinge 100. Thus, first housing member 14 may rotate about the hinge 100 relative to second housing member 16, and second housing member 16 may rotate about hinge 100 relative to first housing member 14.

Flexible display 20 (or more simply "display 20") is disposed within housing 12, but is accessible for viewing and interaction by a user through an opening 13 formed by the first housing member 14 and second housing member 16. Generally speaking, display 20 is to display images for viewing by the user based on machine readable instructions carried out by electronic components (e.g., processor(s)) (not specifically shown) within electronic device 10. In some examples, display 20 is a touch sensitive display that is to communicate with other electronic components (not shown) within electronic device 10 to detect touch inputs by a user on display 20 during operations. In other examples, display 20 may not be touch sensitive. Display 20 may utilize any suitable display technology such as, for example, LCD, plasma, light emitting diode (LED)-LCD, organic-LED-LCD, etc.

In addition, as previously described, display 20 is a flexible display, and thus, display 20 may be deformed, bent, rolled, etc., within acceptable parameters or specifications while maintaining electrical function and connectivity with other components (not shown) within electronic device 10. Thus, when first housing member 14 and second housing member 16 are rotated about hinge 100 relative to one another as previously described above, display 20 is to deform (e.g., roll or bend) proximate to hinge 100 in order to accommodate the relative rotation between the housing members 14, 16.

Figure 2:
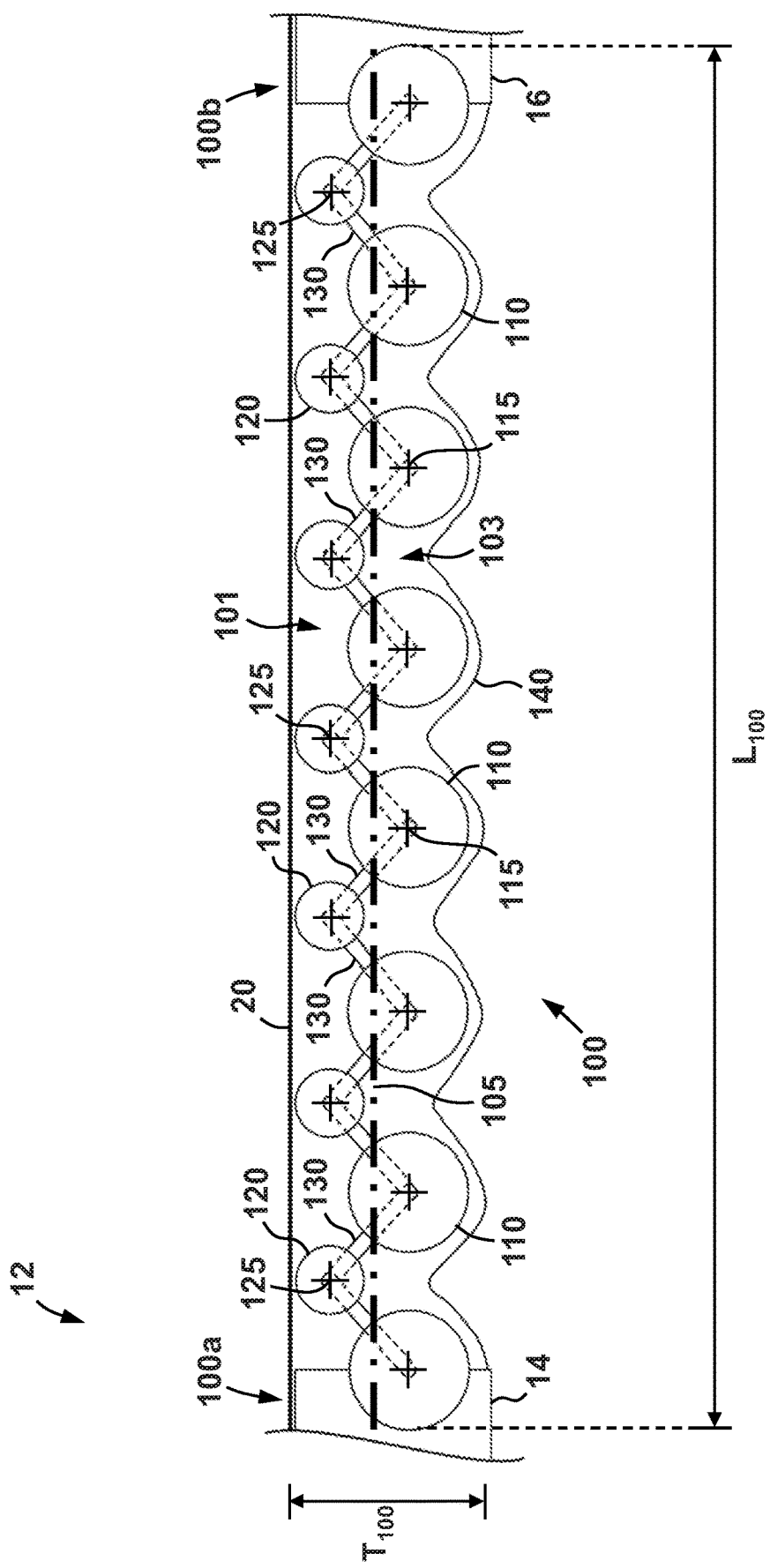
FIG. 2 is a schematic, partial cross-sectional view of the electronic device of FIG. 1 according to some examples, with the housing of the electronic device in an open position.
Figure 3:
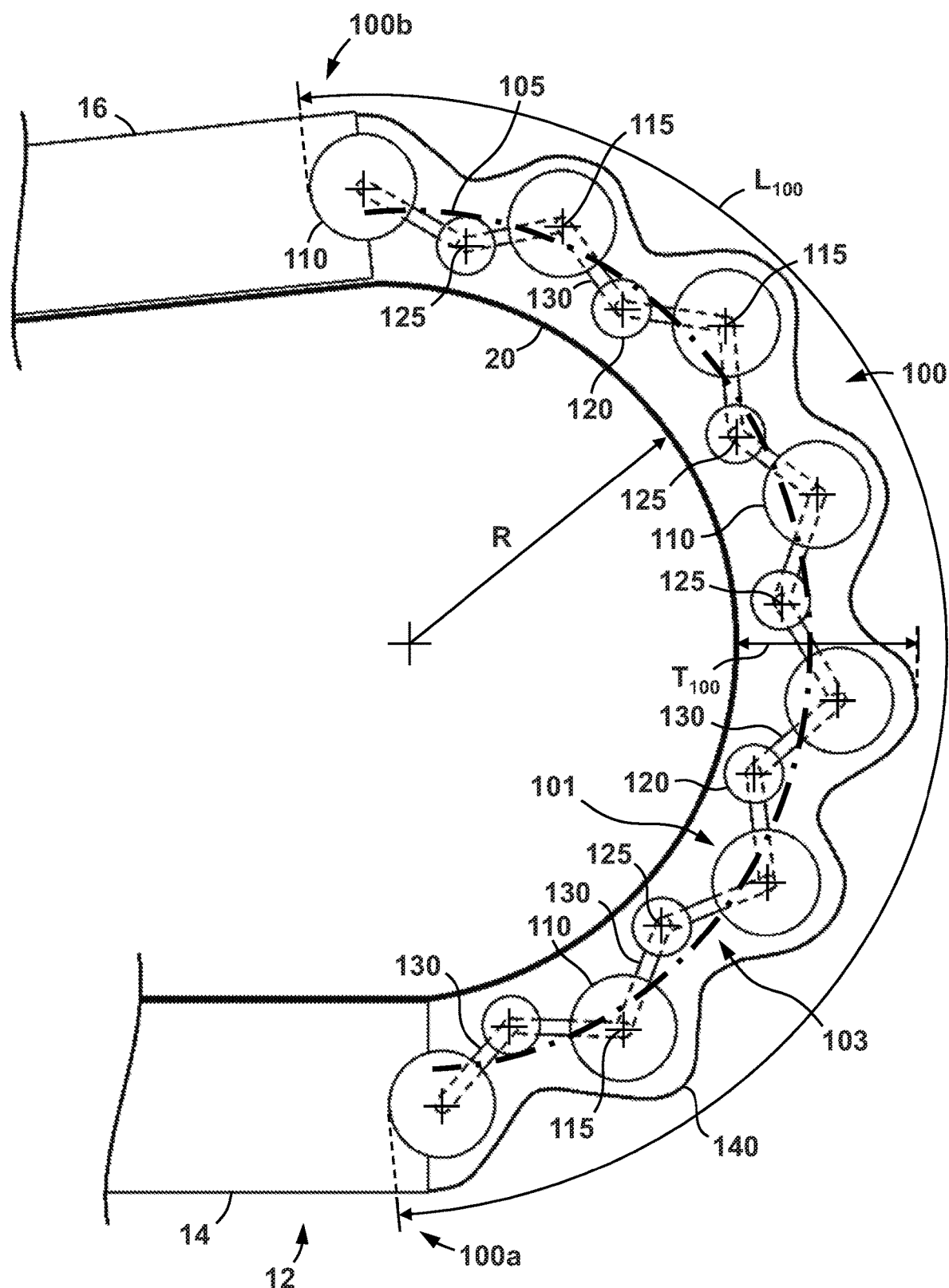
FIG. 3 is a schematic, partial cross-sectional view of the electronic device of FIG. 1 according to some examples, with the housing of the electronic device in a closed position.

Referring now to FIGS. 2 and 3, housing 12 of electronic device 10 may be transitioned between an open position as shown in FIG. 2, and a closed position (or folded position) as shown in FIG. 3. In the closed position (see FIG. 3), the second housing member 16 is rotated about hinge 100, toward first housing member 14 so that display 20 is concealed by housing members 14, 16. In some examples, housing members 14, 16 are in contact with one another (not specifically shown in FIG. 3) when housing 12 is in the closed position. In some examples, the closed position is useful for when a user is transporting the electronic device 10 from one location to another or for when the electronic device 10 is being stored within a bag, pocket, or other compartment. In the open position (see FIG. 2), the second housing member 16 is rotated about hinge 100 away from first housing member 14, to thereby expose display 20. In some examples, the open position may be useful for operation of the electronic device 10 by a user. In some examples (e.g., the example of FIG. 2), when the housing 12 of electronic device 10 is in the open position, an angle between housing members 14, 16 may be equal to approximately 180°, such that both housing members 14, 16 may be disposed flat (or substantially flat along a planar support surface (not shown) (e.g., a desk, a counter-top, a table, etc.). In addition, a user may also operate the electronic device 10 when it is in a position between the fully open position of FIG. 2 and the closed position of FIG. 3 (e.g., when the angle between the housing members 14, 16 is greater than 0° but less than) 180°, such as the position shown in FIG. 1.

When the electronic device 10 is in the closed position (see FIG. 3), display 20 is deformed proximate to hinge 100. As previously described above, because display 20 is flexible, display 20 may generally deform without sustaining damage. However, the flexibility of display 20 has limits (e.g., a minimum radius of curvature) and any deformation of display 20 may be maintained within those limits to avoid damage thereto during operations. In particular, when housing 12 is transitioned to the closed position of FIG. 2 (e.g., from the open position of FIG. 3 or the position of FIG. 1), display 20 is deformed or rolled at or proximate to hinge 100 to a desired radius of curvature R. The radius R may be greater than 0 mm and less than or equal to 5 mm in some examples; however, it should be appreciated that the value of R may be greater than 5 mm in other examples (and thus radius R may be referred to herein as a "non-zero radius"). In some examples, the radius R is set or determined by the minimum radius of curvature that display 20 may occupy without sustaining damage or losing electrical function or connectivity.

Thus, during operations as housing 12 is transitioned to and between the open position (FIG. 2) and the closed position (FIG. 3), hinge 100 is to facilitate and support the deformation of display 20 so as to avoid damage resulting from an excessive deformation thereof. The components and function of hinge 100 will now be described in more detail below.

Referring still to FIGS. 1-3, hinge 100 includes a first end 100a, and a second end 100b opposite first end 100a. First end 100a is coupled to first housing member 14 and second end 100b is coupled to second housing member 16. In addition, hinge 100 includes a total hinge length $L_{100}$ extending from first end 100a to second end 100b. Further, while the thickness of hinge 100 generally varies between ends 100a, 100b in some examples, hinge 100 includes a maximum thickness $T_{100}$.

As will be described in more detail below, as housing 12 of electronic device 10 is transitioned from the open position (FIG. 2) to the closed position (FIG. 3), the hinge length $L_{100}$ of hinge 100 increases. Conversely, as housing 12 of electronic device 10 is transitioned from the closed position (FIG. 3) to the open position (FIG. 2), the hinge length $L_{100}$ of hinge 100 decreases. In addition, as will also be described in more detail below, as electronic device 10 is transitioned from the open position (FIG. 2) to the closed position (FIG. 3) the maximum thickness $T_{100}$ of hinge 100 decreases.

Conversely, as housing 12 of electronic device 10 is transitioned from the closed position (FIG. 3) to the open position (FIG. 2), the maximum thickness $T_{100}$ of hinge 100 increases. These increases and decreases of the hinge length $L_{100}$ and maximum thickness $T_{100}$ of hinge 100 may support and accommodate the deformation of display 20 as housing 12 is transitioned between the open and closed positions as described above.

Referring now to FIGS. 2 and 3, hinge 100 comprises a plurality of first links 110 and a plurality of second links 120. First links 110 each include a corresponding rotational axis 115 (or more simply "axis 115"), and second links 120 each include a corresponding rotational axis 125 (or more simply "axis 125"). Links 110, 120 are arranged within hinge 100 such that axes 115, 125 are parallel and radially spaced from one another. In some examples, axes 115, 125 may be parallel to and radially offset from an axis of rotation of housing members 14, 16 (e.g., the axis about which housing members 14, 16 are rotated about when transitioning housing 12 between the open and closed positions). In some examples, first links 110 and second links 120 are generally cylindrical in cross-section; however, it should be appreciated that links 110, 120 may have any other cross-section in other examples. For instance, in some examples first links 110 and/or second links 120 may have cross-sections that are square, rectangular, polygonal, triangular, oval, irregular, etc.

A centerline 105 extends along hinge 100 between ends 100a, 100b. Centerline 105 is positioned between axes 115 of first links 110 and axes 125 of second links 120 (note: line 105 is referred to herein as a "centerline" because it is generally centered between the axes 115, 125 as shown in FIGS. 2 and 3; however, centerline 105 may be offset from a true center of hinge 100 in various examples). Thus, axes 125 of second links 120 are disposed along a first or front side 101 of centerline 105, and axes 115 of first links 110 are disposed on a second or rear side 103 of centerline 105. As is shown in FIGS. 2 and 3, display 20 is disposed on front side 101 of centerline 105. In addition, in some examples the hinge length $L_{100}$ of hinge 100 is measured along centerline 105, and the maximum thickness $T_{100}$ is measured in a direction that is perpendicular to centerline 105. In some examples, second links are interspersed between the first links 110 along centerline 105 (and thus also along hinge length $L_{100}$), such that each first link 110 is either immediately adjacent to one of the second links 120 along centerline 105 or is disposed between two of the second links 120 along centerline 105.

Figure 4:
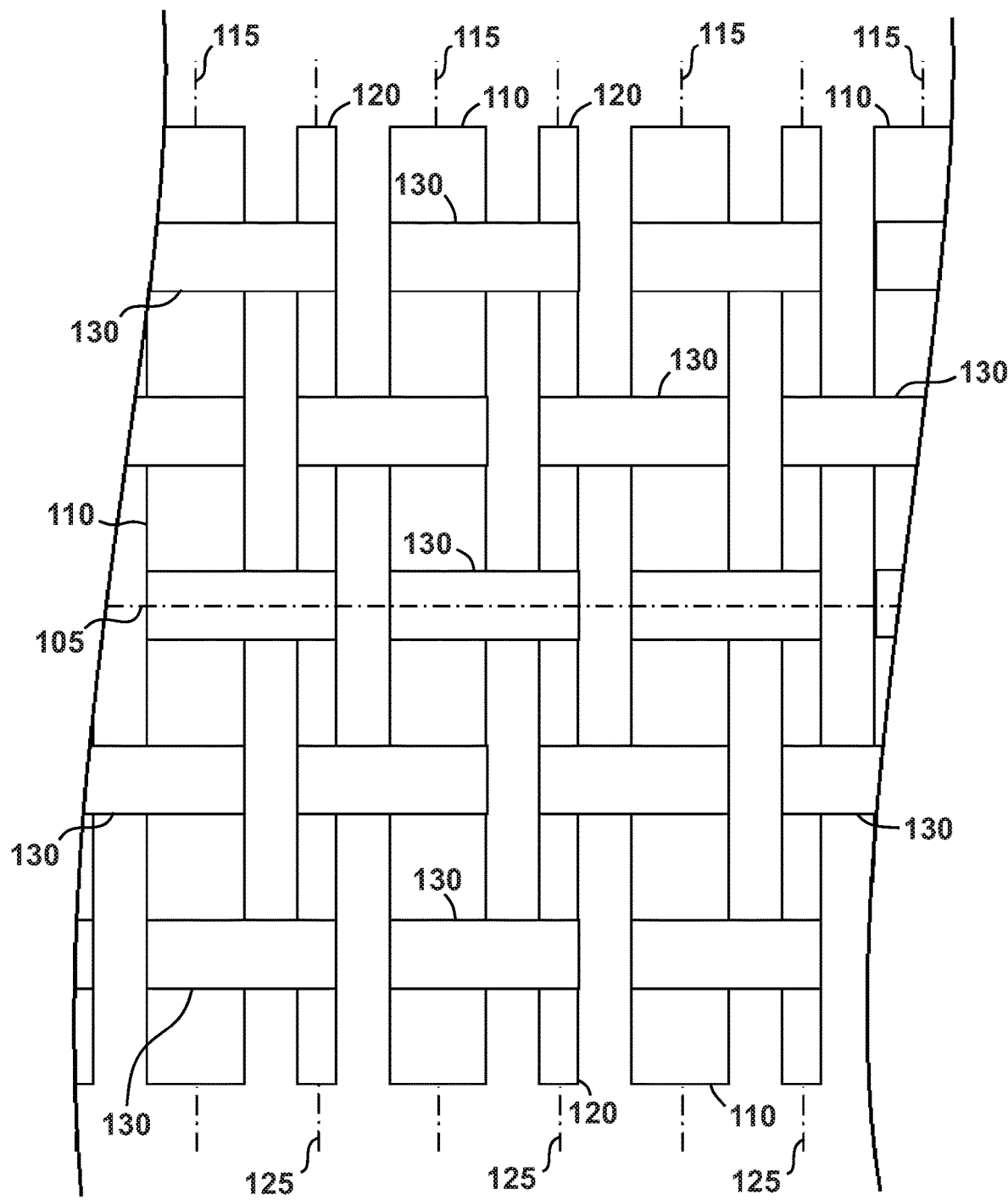
FIG. 4 is a top enlarged partial view of the hinge of the electronic device of FIG. 1 according to some examples.

Referring still to FIGS. 2-4, the first links 110 are pivotably coupled to the second links 120 with a plurality of arms 130. In particular, each arm 130 is pivotably coupled at one end to a corresponding one of the first links 110 and is pivotably coupled at an opposite end to a corresponding one of the second links 120. Accordingly, each arm 130 extends across centerline 105 (e.g., each arm 130 is disposed on both sides 101, 103 of centerline 105). Thus, each arm 130 is to pivot about the axis 115 of a corresponding one of the first links 110 at one end, and is to pivot about the axis 125 of a corresponding one of the second links 120 at an opposite end. As is shown in FIG. 4, in some examples each first link 110 and adjacent second link 120 is pivotably coupled to one another with a plurality of arms 130 that are axially spaced from one another along the corresponding parallel axes 115, 125.

Referring again to FIGS. 2 and 3, in some examples, hinge 100 may include an outer cover 140 that is disposed over first links 110 along second side 103 of centerline 105.

Outer cover 140 may comprise any suitable material, and in some examples may comprise a flexible material that may deform as housing 12 is transitioned between the open position (FIG. 2) and the closed position (FIG. 3) as previously described. For instance, in some examples outer cover 140 comprises an elastomeric and/or polymer material. Without being limited to this or any other theory, outer cover 140 may prevent (or at least restrict) dust, particles, or other objects from entering into the spaces between first and second links 110, 120). In some examples, outer cover 140 is omitted.

Referring still to FIGS. 2 and 3, during operations as housing 12 is transitioned from the open position (FIG. 2) to the closed position (FIG. 3), the second links 120 are translated or moved toward first links 110, such that axes 125 of second links 120 are moved toward centerline 105 and the maximum thickness $T_{100}$ of hinge 100 is decreased. In particular, as first housing member 14 is rotated about hinge 100 toward second housing member 16 toward the closed position of FIG. 3, the axis 125 of each second link 120 moves toward centerline 105 in a direction that is perpendicular to centerline 105 proximate the corresponding axis 125. Simultaneously, the relative movement of second links 120 and first links 110 also cause arms 130 to pivot about the axes 115, 125 of the corresponding links 110, 120. Specifically, as second links 120 move toward first links 110 as previously described, each arm 130 pivots about its ends to decrease the angles between the arms 130 and centerline 105 and thereby push adjacent links 110, 120 apart from one another along centerline 105. As a result, the transition of housing 12 from the open position of FIG. 2 to the closed position of FIG. 3 causes the hinge length $L_{100}$ of hinge 100 to increase.

Conversely, as housing 12 is transitioned from the closed position (FIG. 3) to the open position (FIG. 2), the second links 120 are translated or moved away from first links 100 such that axes 125 of second links 120 are moved away from centerline 105 and the maximum thickness $T_{100}$ of hinge 100 is increased. In particular, as first housing member 14 is rotated about hinge 100 away from second housing member 16 toward the open position of FIG. 2, each axis 125 moves away centerline 105 in a direction that is perpendicular to centerline 105 proximate the corresponding axis 125. Simultaneously, arms 130 pivot about the axes 115, 125 of the corresponding links 110, 120 to increase the angles between arms 130 and centerline 105 such that adjacent links 110, 120 are pulled toward one another along centerline 105. As a result, the transition of housing 12 from the closed position of FIG. 3 to the open position of FIG. 2 causes the hinge length $L_{100}$ of hinge 100 to decrease.

Referring still to FIGS. 2 and 3, as housing 12 of electronic device 10 is transitioned from the open position of FIG. 2 to the closed position of FIG. 3, the flexible display 20 is rolled or curved to the minimum radius of curvature R as previously described. Conversely, as housing 12 of electronic device 10 is transitioned from the closed position of FIG. 3 to the open position of FIG. 2, the curvature of display 20 at hinge 100 progressively decreases (e.g., from the minimum radius of curvature R) until display 20 is substantially flat (e.g., when housing 12 reaches the fully open position of FIG. 2). Without being limited to this or any other theory, the changes (increases and decreases) in the hinge length $L_{100}$ and maximum thickness $T_{100}$ of hinge 100 as housing 12 is transitioned between the open and closed positions may allow hinge 100 to support and accommodate the deformations and curvatures in display 20 during operations. Specifically, the increase in hinge length $L_{100}$ and simultaneous decrease in maximum thickness $T_{100}$ as housing 12 is transitioned toward the closed position of FIG. 3 may allow hinge 100 (e.g., particularly second links 120) to deform so as to accommodate the desired deformation and curvature of flexible display 20. Conversely, the decrease in hinge length $L_{100}$ and simultaneous increase in maximum thickness $T_{100}$ as housing 12 is transitioned toward the open position of FIG. 2 may allow hinge 100 (e.g., particularly second links 120) to support and accommodate the flattening of display 20 at hinge 100.

In some examples, second links 120 may engage with (e.g., directly or indirectly) display 20. For instance, in some examples, second links 120 may engage with display 20 (or a membrane and/or other layers or components that are engaged with display 20) when housing 12 is in the open position (FIG. 2), the closed position (FIG. 3), or any position therebetween. Accordingly, in some of these examples, the above described movement of second links 120 may drive actuation or movement of display 20 (e.g., so as to form the curvature of radius R). In addition, while the second links 120 translate or move relative to first links 110 in the above described examples, in other examples, first links 110 and/or second links 120 may translate or move relative to centerline 105 as housing 12 is transitioned between the open position (FIG. 2) and the closed position (FIG. 3). Further, in some examples, the pivoting connections between arms 130 and links 110, 120 may resist some amount of torque such that hinge 100 may maintain a desired relative rotational positioning of first housing member 14 and second housing member 16 during operations (e.g., such that housing 12 main be maintained in the position shown in FIG. 1). For instance, in some examples, the connections between arms 130 and links 110, 120 may include a sufficient amount of friction and/or a suitable torque resistance member or device (e.g., torsional spring, bearing, etc.) so that a relative rotational position between the arms 130 and links 110, 120 may be maintained until additional external force (e.g., from a user's hand) is applied to rotate housing members 14, 16 relative to one another about hinge 100 as described above.

As described above, examples disclosed herein include electronic devices that employ hinges (e.g., hinge 100) to support and accommodate a controlled deformation of a flexible display as the electronic device is transitioned to and between open and closed positions. Accordingly, through use of the example hinges disclosed herein (and electronic devices including such hinges), damage and wear to a flexible display caused by the transitioning of the electronic device between a closed (or folded) position and an open position may be reduced or eliminated.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. An electronic device comprising: a first housing member; a second housing member; a hinge coupled between the first housing member and the second housing member; and a flexible display coupled to the first housing member and the second housing member, wherein the hinge comprises: a first end coupled to the first housing member; a second end coupled to the second housing member; a centerline extending between the first end and the second end; an outer cover extending between the first end and the second end; a hinge length extending along the centerline from the first end to the second end; and a thickness extending perpendicularly to the centerline to an outermost surface of the outer cover; wherein the hinge length is to increase and the thickness is to decrease as the first housing member is rotated about the hinge toward the second housing member, wherein the hinge comprises a proximate the flexible display than the plurality of first links.

2. The electronic device of claim 1, wherein the plurality of second links are interspersed between the plurality of first links along the hinge length.

3. The electronic device of claim 2, wherein the plurality of second links are pivotably coupled to the plurality of first links with a plurality of arms.

4. An electronic device, comprising: a housing; and a flexible display supported by the housing; wherein the housing comprises: a first housing member; a second housing member; and a hinge coupled between the first housing member and the second housing member along a centerline, wherein the flexible display extends along the hinge, on a first side of the centerline, wherein the hinge includes an outer cover extending on a second side of the centerline that is opposite the first side, and wherein the hinge is to increase in length, along the centerline, between the first and second housing members and a thickness of the hinge extending across the centerline from the flexible display to an outermost surface of the outer cover is to decrease as the first housing member is rotated about the hinge toward the second housing member, wherein the hinge comprises a plurality of first links and a plurality of second links pivotably coupled to the plurality of first links, wherein the second links are more proximate the flexible display than the first links.

5. The electronic device of claim 4, wherein each first link includes a rotational axis and each second link includes a rotational axis, wherein the rotational axis of each second link is disposed on the first side of the centerline, and the rotational axis of each first link is disposed on the second side of the centerline; and wherein the plurality of second links are pivotably coupled to the plurality of first links with a plurality of arms that extend across the centerline; wherein each arm is pivotably coupled to a corresponding one of the first links at a first end, and is pivotably coupled to a corresponding one of the second links at a second end.

6. The electronic device of claim 5, wherein each arm is to rotate about the rotational axis of the corresponding one of the first links and about the rotational axis of the corresponding one of the second links to increase a distance between the first links and the second links along the centerline as the first housing member is rotated about the hinge toward the second housing member.

7. The electronic device of claim 5, wherein each arm is to rotate about the rotational axis of the corresponding one of the first links and about the rotational axis of the corresponding one of the second links to decrease the distance between the first links and the second links along the centerline as the first housing member is rotated about the hinge away from the second housing member.

8. The electronic device of claim 5, wherein the thickness of the hinge across the centerline from the flexible display to the outermost surface of the outer cover is to increase as the first housing member is rotated about the hinge away from the second housing member.

9. An electronic device, comprising: a housing; and a flexible display supported by the housing; wherein the housing comprises: a first housing member; a second housing member; and a hinge coupled to and extending between the first housing member and the second housing member along a centerline, wherein the flexible display extends along the hinge on a first side of the centerline, and wherein the hinge includes an outer cover extending between the first housing member and the second housing member on a second side of the centerline that is opposite the first side; wherein a length of the hinge along the centerline is to increase and a thickness of the hinge extending from the flexible display to an outermost surface of the outer cover is to decrease as the first housing member is rotated about the hinge toward the second housing member; and wherein the outer cover is to flexibly deform as the first housing member is rotated about the hinge relative to the second housing member, wherein the hinge comprises a plurality of first links and a plurality of second links wherein the plurality of second links are interspersed between and pivotable coupled to the plurality of first links, and wherein the second links are more proximate the flexible display than the plurality of first links.

10. The electronic device of claim 9, wherein each first link includes a rotational axis and each second link includes a rotational axis, wherein the rotational axis of each second link is disposed on the first side of the centerline, and the rotational axis of each first link is disposed on the second side of the centerline; and wherein the plurality of second links are pivotably coupled to the plurality of first links with a plurality of arms that extend across the centerline; wherein each arm is pivotably coupled to a corresponding one of the first links at a first end, and is pivotably coupled to a corresponding one of the second links at a second end.

11. The electronic device of claim 10, wherein each arm is to rotate about the rotational axis of the corresponding one of the first links and about the rotational axis of the corresponding one of the second links to increase a distance between the first links and the second links along the centerline as the first housing member is rotated about the hinge toward the second housing member.

12. The electronic device of claim 11, wherein each arm is to rotate about the rotational axis of the corresponding one of the first links and about the rotational axis of the corresponding one of the second links to move the rotational axes of the second links toward the centerline as the first housing member is rotated about the hinge toward the second housing member.

13. The electronic device of claim 12, wherein the plurality of first links and the plurality of second links have a cylindrical cross-section.

* * * * *